Dec. 20, 1960 R. HENDERSON ET AL 2,965,412
EXTENSIBLE AUTOMOBILE TRAILER
Filed March 4, 1957 9 Sheets-Sheet 1

INVENTORS
ROBERT HENDERSON &
BERNARD LINDENBERG
BY
their ATTORNEYS

Dec. 20, 1960  R. HENDERSON ET AL  2,965,412
EXTENSIBLE AUTOMOBILE TRAILER
Filed March 4, 1957  9 Sheets-Sheet 2

INVENTORS
ROBERT HENDERSON &
BERNARD LINDENBERG
BY
Brumbaugh, Free, Graves & Donohue
their ATTORNEYS Dec. 20, 1960   R. HENDERSON ET AL   2,965,412
EXTENSIBLE AUTOMOBILE TRAILER
Filed March 4, 1957   9 Sheets-Sheet 4
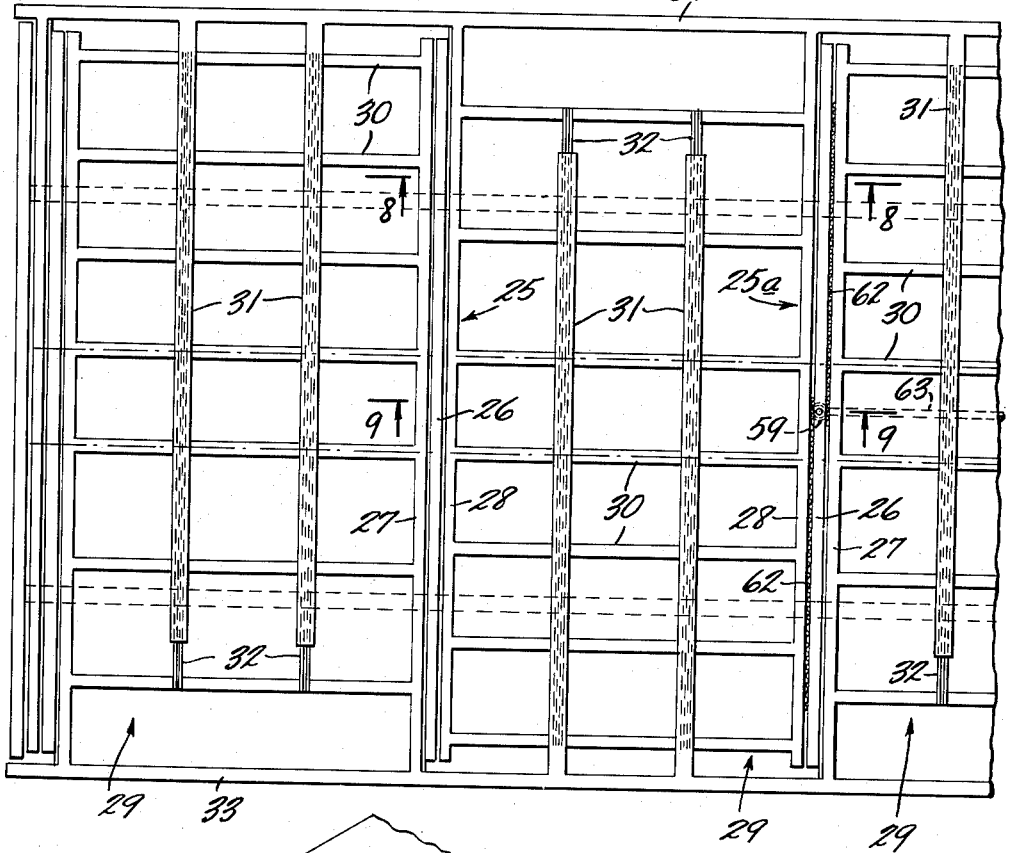
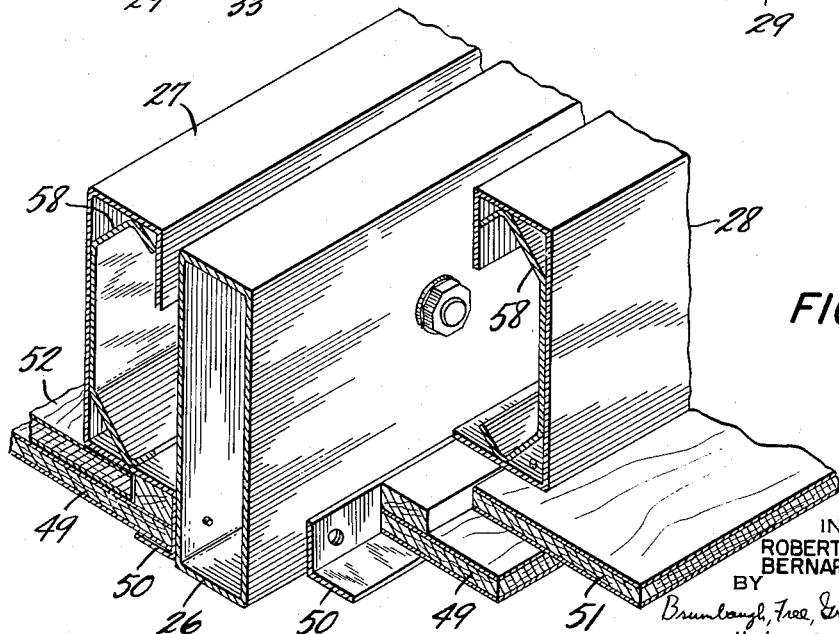
INVENTORS
ROBERT HENDERSON &
BERNARD LINDENBERG
BY
Brumbaugh, Free, Graves & Donohue
their ATTORNEYS

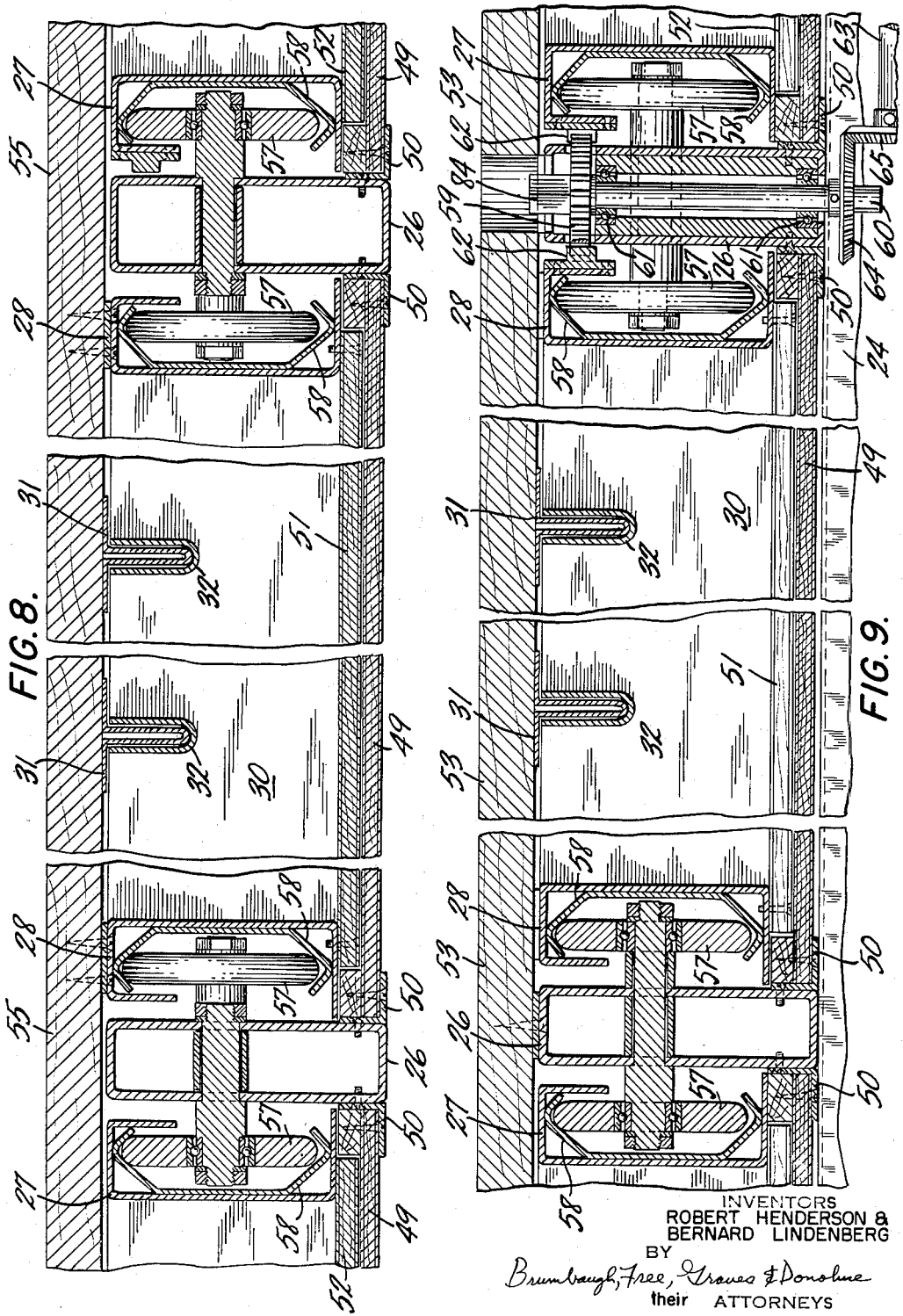

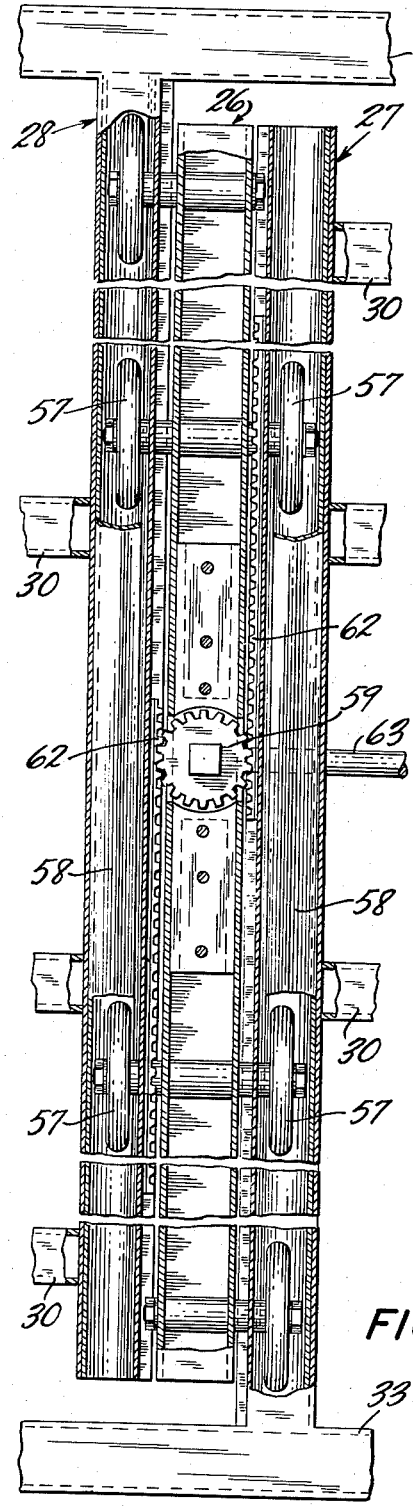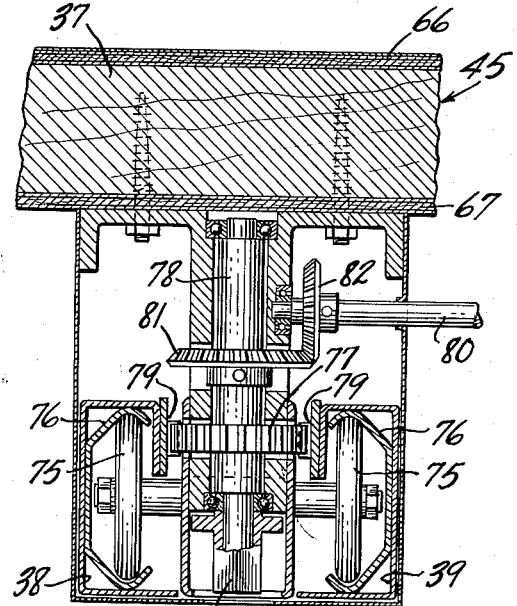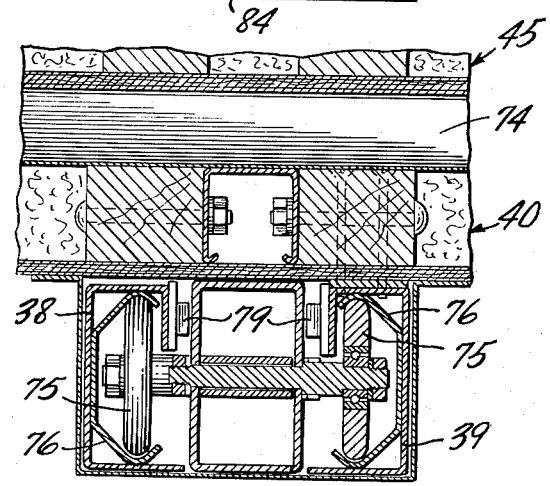

Dec. 20, 1960 R. HENDERSON ET AL 2,965,412
EXTENSIBLE AUTOMOBILE TRAILER
Filed March 4, 1957 9 Sheets-Sheet 9

INVENTORS.
ROBERT HENDERSON &
BERNARD LINDENBERG
BY
Brumbaugh, Free, Graves & Donohue
their ATTORNEYS.

United States Patent Office 2,965,412
Patented Dec. 20, 1960

2,965,412

EXTENSIBLE AUTOMOBILE TRAILER

Robert Henderson, Indio House, Bovey Tracey, South Devon, England, and Bernard Lindenberg, 2915 Dalewood Road, Little Rock, Ark.

Filed Mar. 4, 1957, Ser. No. 643,614

7 Claims. (Cl. 296—23)

This invention relates to automobile trailers, and more particularly, to an extensible trailer adapted to be used in either the extended or the retracted condition.

In the design of automobile trailers and the like for use on public highways, the width of the trailer structure is frequently restricted by vehicle size limitations to a maximum of eight feet, for example. House trailers so confined in width are necessarily limited in living space and require an inconvenient arrangement of furnishings and accommodations.

In order to overcome these inadequacies, extensible trailers have been designed in the past but these require external supports for the extended portions or are difficult to extend and contact or are incapable of use in the retracted condition.

It is an object of this invention, accordingly, to provide an exensible automobile trailer adapted for use in either the extended or the retracted condition.

Another object of the invention is to provide a trailer of the above character which is self-supporting in the extended condition.

A further object of the invention is to provide an extensible trailer completely surrounded by a double wall for insulation in the extended condition.

These and other objects of the invention are attained by supporting the extensible portions of the trailer in cantilever fashion from a series of multiple beam structures mounted on the trailer chassis. Two oppositely disposed extensible portions may thus be balanced with respect to the trailer chassis, being rigidly supported by a series of interlacing frames constructed between the multiple beam structures. An interlocking drive system extends the floor and roof of each portion uniformly to assure smooth and efficient operation and the drive systems for both extensible portions may be connected for simultaneous extension.

Further objects and advantages of the invention will be apparent to those skilled in the art from a reading of the following description in conjunction with the accompanying drawings in which:

Fig. 4 is a sectional view showing the interlocking floor frame construction and taken along the lines 4—4 of Fig. 3;

Fig. 7 is an enlarged fragmentary view in perspective showing the arrangement of the supporting beams;

Fig. 8 is an enlarged sectional view in elevation taken along the lines 8—8 of Fig. 4;

Fig. 9 is an enlarged sectional view in elevation taken along the lines 9—9 of Fig. 4;

Fig. 10 is an enlarged plan view, partly in section, illustrating the structure of one of the composite supporting beams;

Fig. 13 is a view in vertical section taken along the lines 13—13 of Fig. 11; and Fig. 14 is a view in vertical section taken along the lines 14—14 of Fig. 11.

Figure 1:
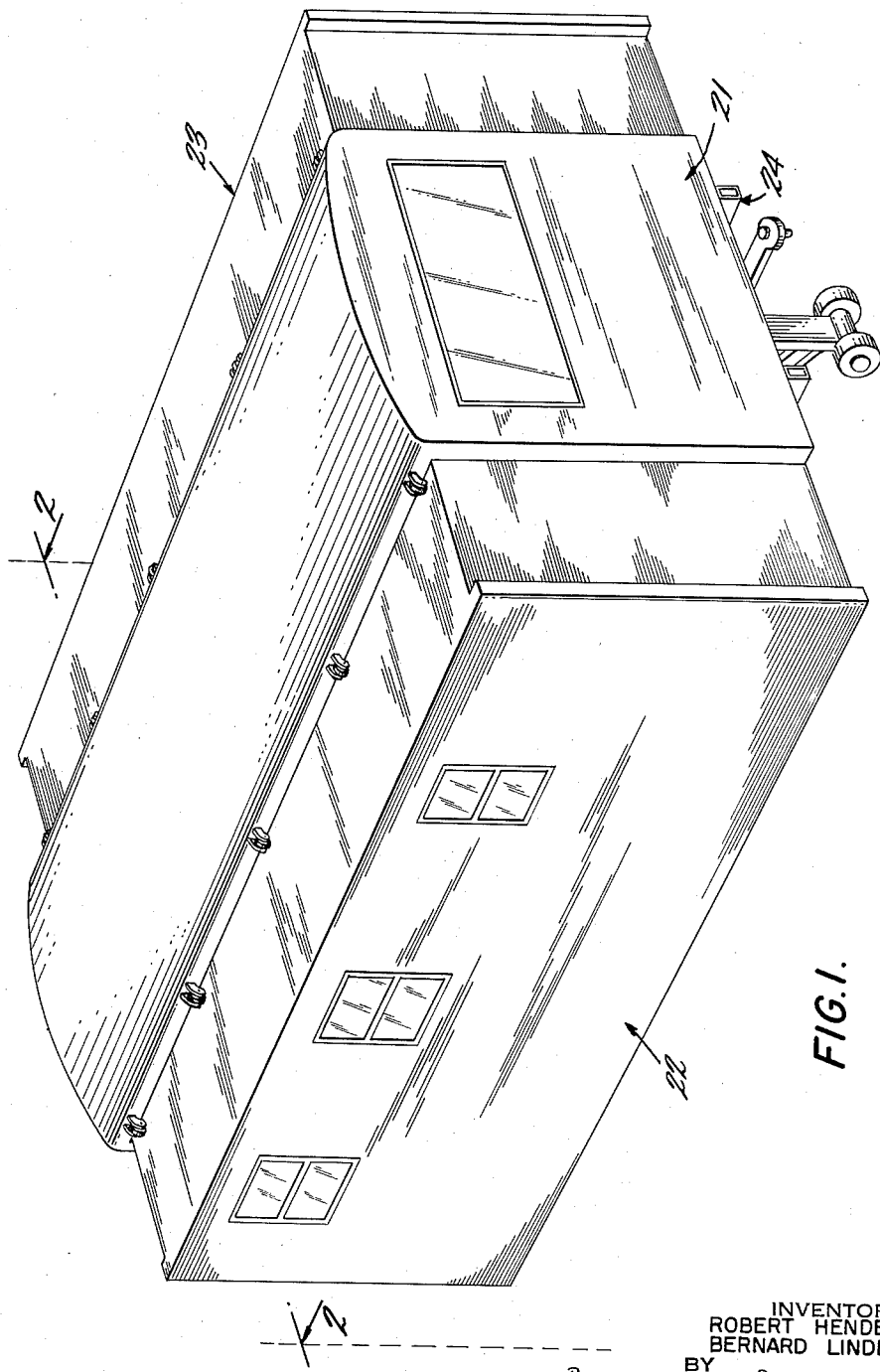
Fig. 1 is a view in perspective of one type of extensible trailer constructed according to the invention.
Figure 2:
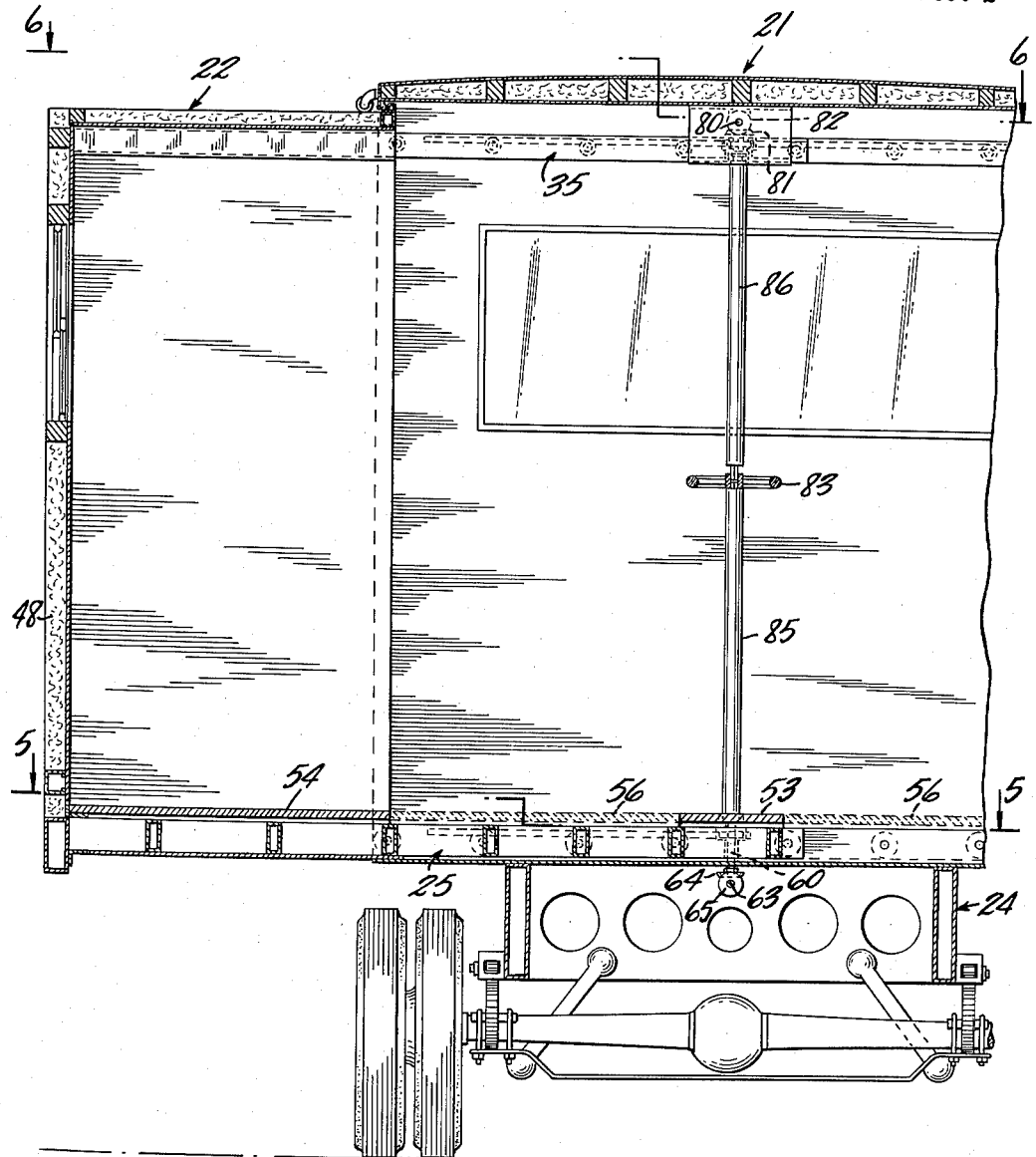
Fig. 2 is a partial cross-sectional view taken through the trailer of Fig. 1 along the lines 2—2 and looking in the direction of the arrows.
Figure 3:
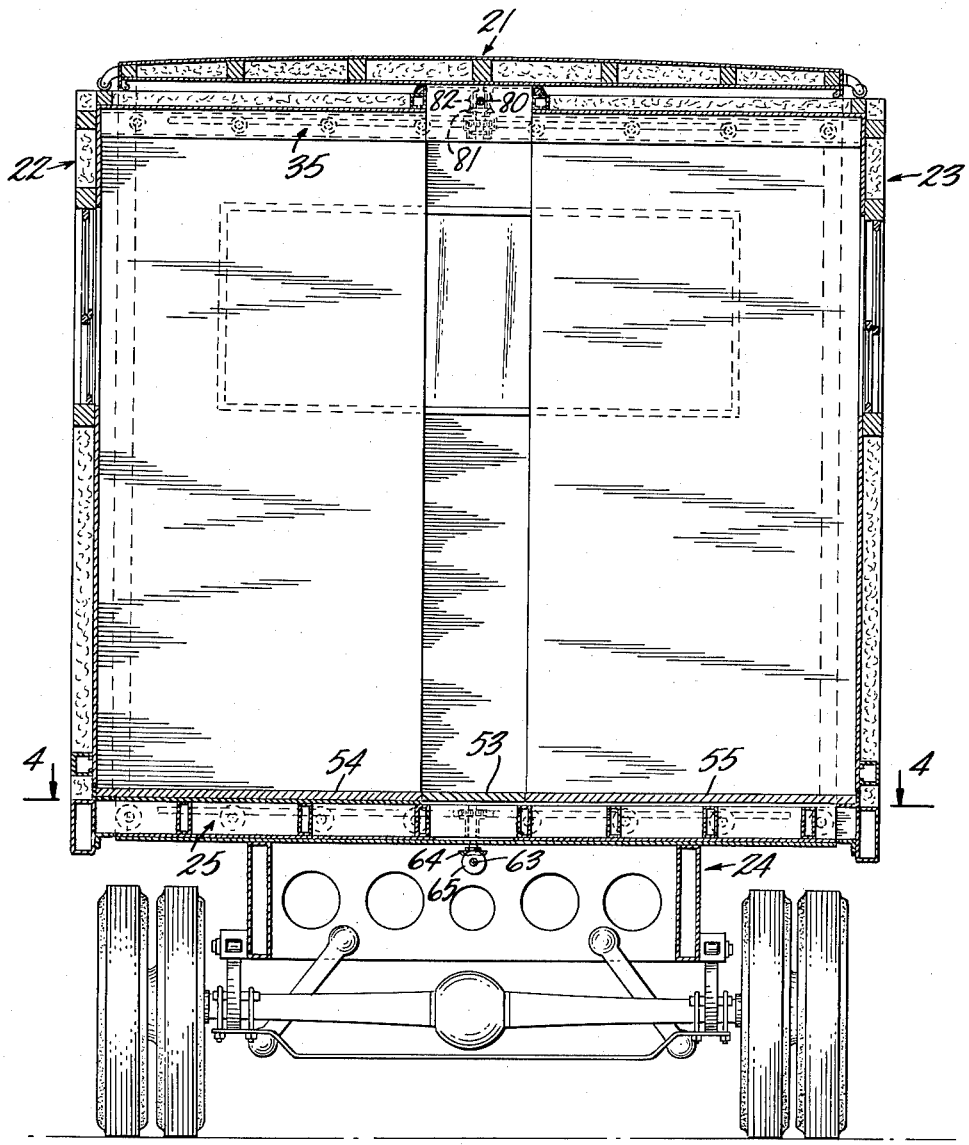
Fig. 3 is a cross-sectional view similar to that of Fig. 2 showing the trailer with the extensible portions retracted.
Figure 5:
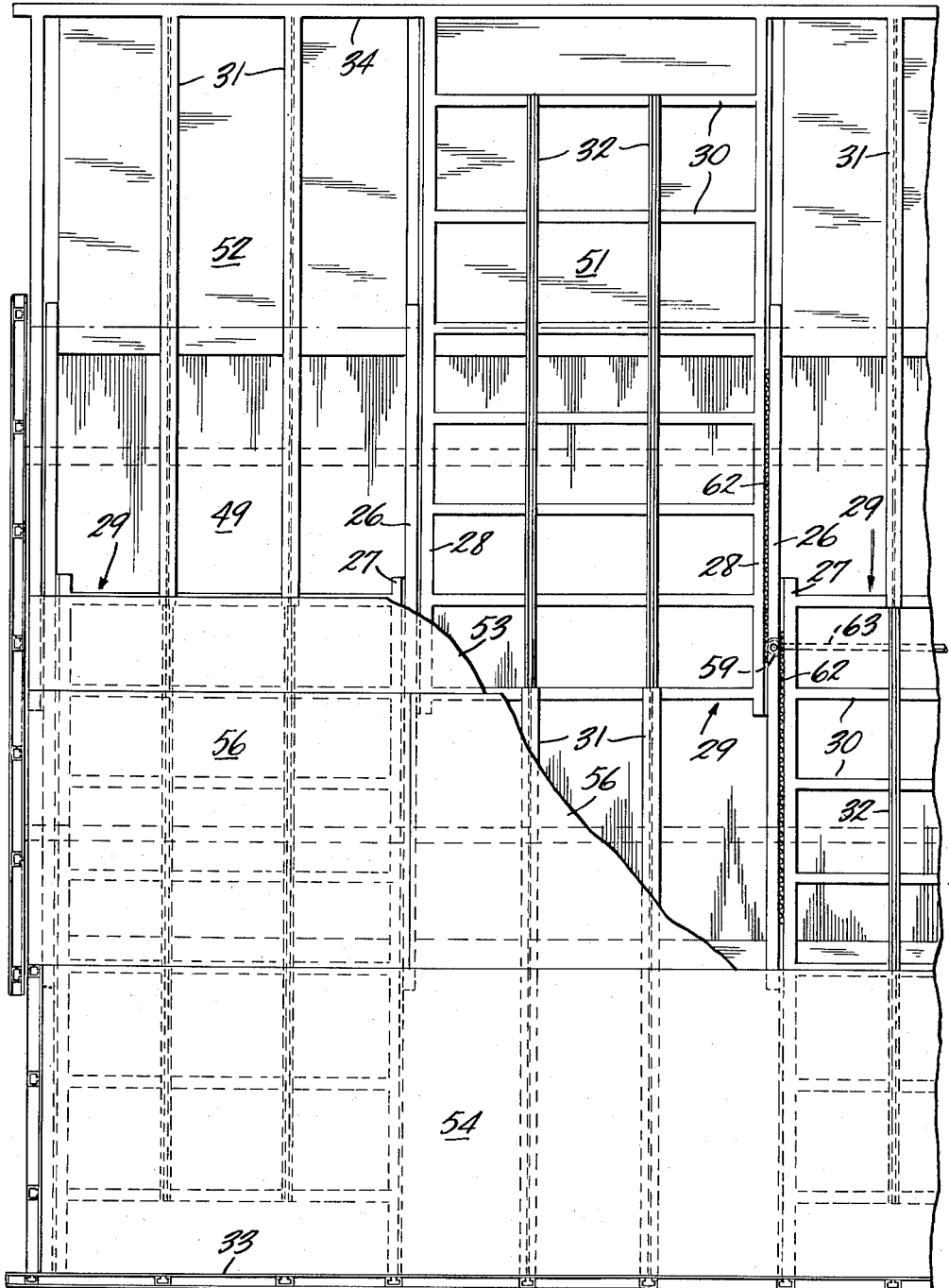
Fig. 5 is a sectional view of the extended floor structure taken along the lines 5—5 of Fig. 2.

The typical embodiment of the extensible trailer of the invention comprises a central housing 21 having two enclosed side portions 22 and 23 which may be laterally extended as shown in Figs. 1 and 2 or retracted to approximately half the extended width as seen in Fig. 3. Supporting the entire structure on a chassis 24 of conventional design is a series of transverse composite lateral beam members 25. As best seen in Figs. 4 and 5, each of these members is comprised of a fixed beam 26 secured to the chassis 24 and two movable beams 27 and 28 mounted thereon in a manner to be described to permit lateral motion in opposite directions, the extensible portions 22 and 23 of the trailer being affixed to the beams 27 and 28, respectively.

It will be noted that the beams 27 and 28 are alternately arranged on opposite sides of the fixed beam 26 permitting a frame structure 29 consisting, for example, of a series of cross bars 30, to be constructed between each pair of adjacent movable beams on each side of the trailer. In addition, two transverse T-bars 31, each slideably mounted in a channel member 32 passing through the cross-bars 30, support the extensible portions within the spaces between the frames, the outer ends of the T-bars being affixed to either of two longitudinal beam members 33 and 34 on opposite sides of the trailer. Thus, there is provided a series of interlacing frames having sufficient strength to support both extensible portions of the trailer from the chassis in cantilever fashion without requiring external jacks or props when extended.

Figure 6:
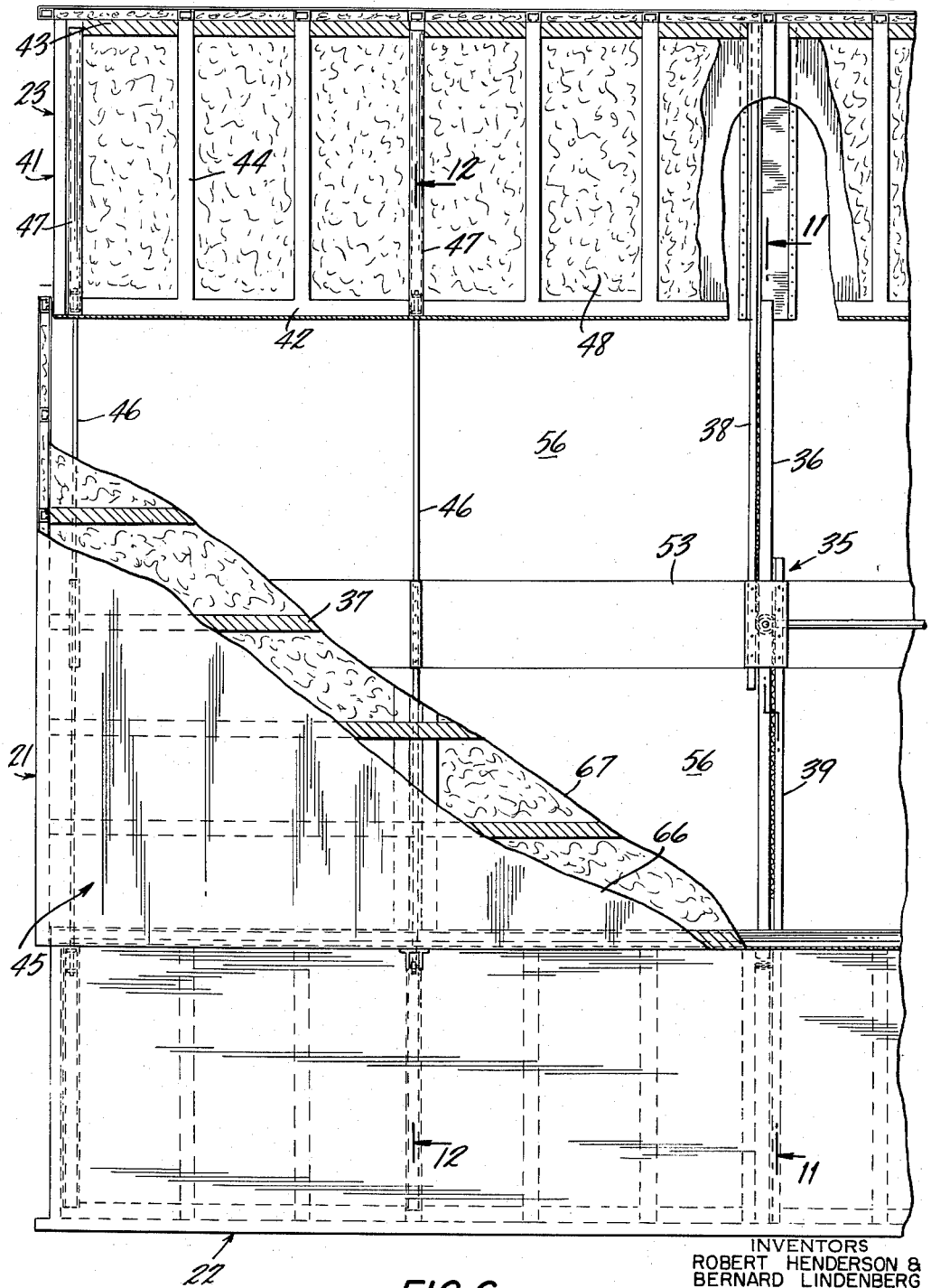
Fig. 6 is a partial sectional illustration showing the roof construction taken along the lines 6—6 of Fig. 2.
Figure 11:
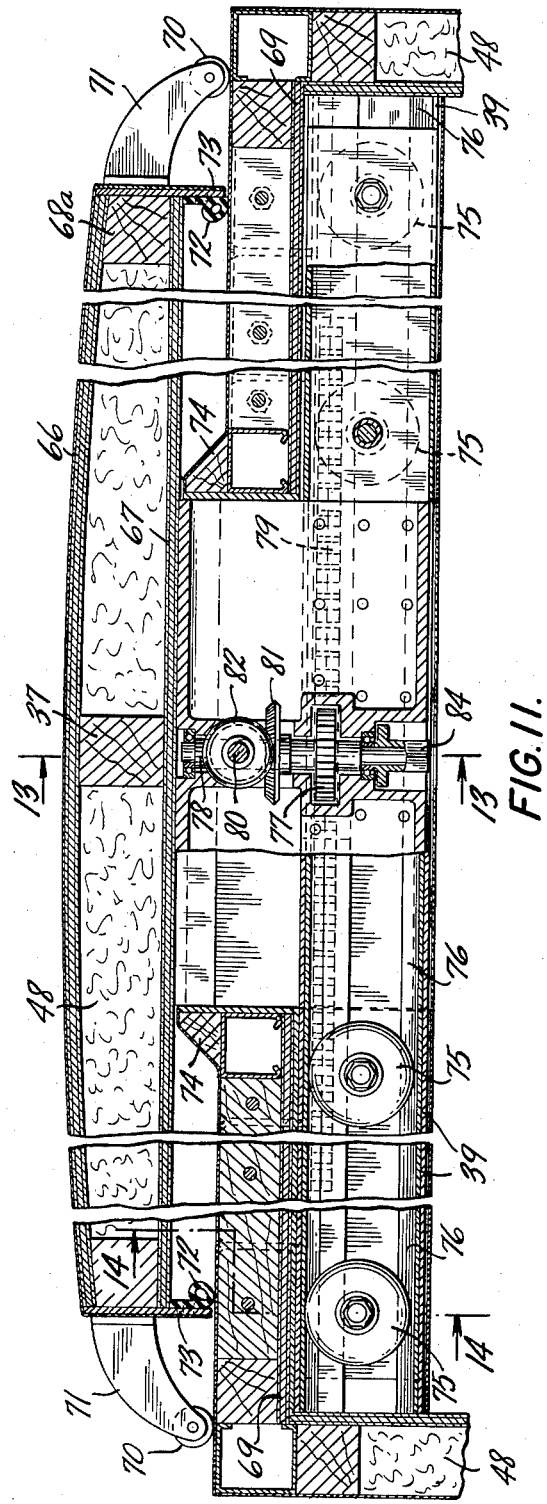
Fig. 11 is an enlarged sectional view taken along the lines 11—11 of Fig. 6 with the extensible portions of the trailer retracted.
Figure 12:
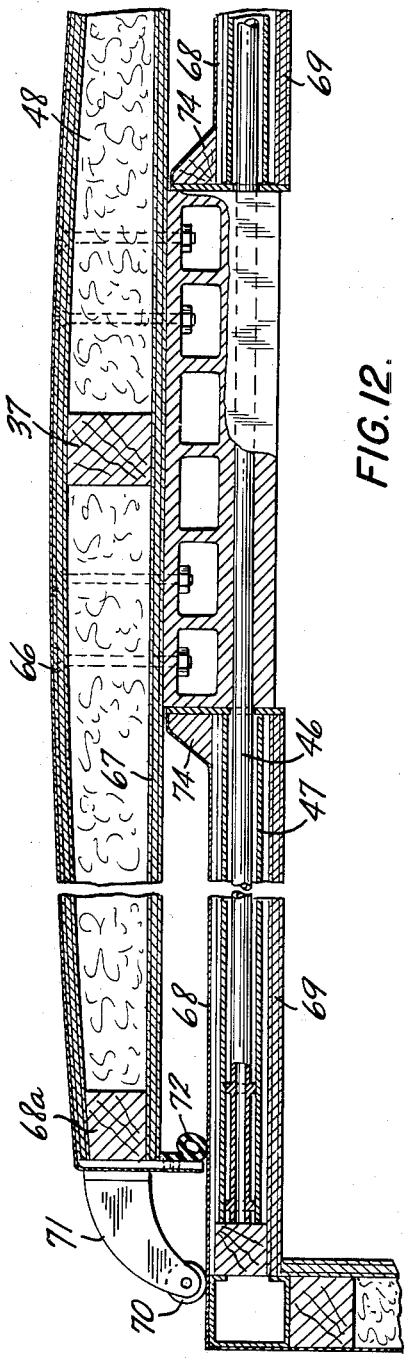
Fig. 12 is an enlarged sectional view taken along the lines 12—12 of Fig. 6 with the trailer retracted.

As illustrated in Fig. 6, the roof of the trailer is constructed with lateral composite beams 35 in a similar manner, a series of fixed transverse beam members 36 being secured to a longitudinal central beam 37 at the top of the central housing, and two movable beam members 38 and 39 being slideably mounted on each of the fixed beams 36 for lateral movement to the opposite sides of the trailer. In this case, however, there being no need for supporting strength, the extensible roof members 40 and 41 may each be comprised of a pair of longitudinal beams 42 and 43 connected by a series of lateral cross-bars 44 and adapted to overlap and slide under a central roof member 45 when the extensible portions are retracted. Interspaced between the fixed beams 35, a series of transverse tubular guide members 46 is supported from the longitudinal beam 37 and each of these telescopically engages two pipe members 47, mounted within the roof members 40 and 41 on opposite sides of the trailer, to guide the extensible portions during extension and retraction.

Utilization of the novel floor and roof arrangement described above permits the entire trailer to be enclosed by a double-skin structure in both the extended and the retracted conditions, leaving an insulating dead air space within the walls, roof and floor. If desired, this space may be filled throughout with an insulating material 48 except in the spaces between the interlaced frames 29 of the extended floor structure.

Beneath the interlaced floor frame network, the lower skin of the double-skin floor construction comprises a series of fixed panels 49 extending the width of the retracted trailer and supported between adjacent fixed beams 26 as by lateral brackets 50. Mounted beneath each of the frame members 29 and extending outwardly from the center of the retracted trailer to opposite sides alternately, is another series of panels 51, these being mounted between the adjacent movable beams 27, 27 and 28, 28 to underlie the frames 29. The panels 51 are positioned to overlap the panels 49 and slide above them when the side portions of the trailer are retracted. A third series of panels 52 is mounted beneath the open portions of the interlaced frame network, being secured at their outer ends to the longitudinal beams 33 and 34 alternately and disposed at their inner ends to slide above the central panels 49 and abut the panels 51 at the center of the trailer when the sides are retracted.

It will be noted that other panel arrangements will serve equally well to form a complete lower skin. For example, the slideable panel 51 might be positioned below the fixed panel 49 and mounted between the beams 28 by brackets, the panel 49 being affixed to the beams 36 at the center of the trailer and engaging the grooves between the beams 28 and the panel 51. In another arrangement, the fixed panels 49 might be secured to the beams 26 immediately below the beams 27 and 28, leaving grooves formed by the brackets 50 to guide the slideable panels 51 and 52 beneath the fixed panels and permitting adjacent slideable panels to be joined below the beams 26 outside the trailer chassis 24. Also, the fixed panels 49 might be eliminated and the panels 51 and 52 extended the full width of the trailer in overlapping fashion, the panel 52 being the lower of the two and guided above the trailer chassis by the brackets 50.

Above the frame network, the floor is comprised of a narrow central panel 53 extending the length of the trailer and two longitudinal outer panels 54 and 55 dimensioned to fit against the center panel when the trailer is retracted. To complete the top layer of flooring when the trailer is extended, a series of removable panel sections 56 may be inserted between the central panel 53 and each of the outer panels 54 and 55, as shown in Figs. 2 and 5. Thus, the trailer floor is on a single level whether in the extended or the retracted condition. Furniture and fixtures may be mounted on the outer panels 54 and 55 so that the trailer may be used in the retracted condition when necessary as, for example, for overnight stops.

As mentioned above, each of the beam members 27 and 28 is slideably mounted on a fixed beam 26 to provide cantilever support for the side portions 22 and 23 when extended. This arrangement is best illustrated in Figs. 8, 9 and 10 wherein it will be seen that a series of wheels 57 is rotatably mounted at intervals along each side of the fixed beam 26 from the center of the trailer to the end toward which the movable beam is to be extended. It will be noted that the first wheel 57 on each side of the fixed beam is located near the center of the beam on the side opposite to that toward which the movable beam is to be extended so that the inner end of each beam is securely supported when extended. Although only three of the wheels 57 are illustrated on each side of the fixed beam 26 in the contracted illustration of Fig. 10, it will be understood that other wheels are similarly disposed in the cut-away sections.

Enclosed within each of the beams 27 and 28 is an inwardly opening channel member 58 which forms a track adapted to receive the wheels 57 and provide rolling support for the beams 27 and 28. It will be noted that the wheels 57 are dimensioned to fit closely within the channels 58 in the vertical direction, thus minimizing any tendency of the beams to cock with respect to the fixed beam 26 as the trailer is extended or retracted.

In order to drive both extensible portions 22 and 23 of the trailer at a uniform rate to prevent longitudinal cocking or wedging with respect to the center housing 21, several selected composite beams 25a spaced at intervals along the length of the trailer are provided with a centrally mounted pinion 59 secured to a vertical shaft 60 mounted as by bearings 61 within the fixed beam 26. Each pinion 59 engages a pair of racks 62 disposed along the inside edges of the beams 27 and 28 in opposed relation so that rotation of the shaft 60 drives the beams in opposite directions. Mounted beneath the trailer chassis 24, a longitudinal shaft 63 connects all the vertical shafts 60 through bevel gears 64 and 65, linking all the pinions 59 for synchronous rotation.

Referring to Figs. 11, 12, 13 and 14, the roof of the trailer is likewise arranged with a double-skin construction, the central roof member 45 having upper and lower panels 66 and 67 spaced by the beam 37 and by other longitudinal beams 68a and the side members 40 and 41 being enclosed by upper and lower panels 68 and 69. In order to support the edges of the central roof members 45 and to prevent excessive friction during extension and retraction, a series of rollers 70 is mounted along the edge in brackets 71 to engage the top of the movable roof sections. A sealing gasket 72 is mounted on a flange 73 along the edges of the roof to cooperate with the movable roof sections 40 and 41 and with internal sealing members 74 mounted thereon, preventing leakage of moisture into the interior of the trailer. The ends of the trailer are arranged to overlap in a similar manner and gasketing may likewise be used there to seal the joints between the extensible portions and the central housing. The construction of the composite roof beams 35 is similar to that of the floor beams 25a, a series of wheels 75 being mounted along each side of the fixed beam 36 to support the movable beams 37 and 38 in internal channels 76, thus supporting the movable roof sections 40 and 41 in cantilever fashion from the center of the trailer. Each of the composite beams 35 is driven by a pinion 77 mounted on a shaft 78 within the fixed beam 36 and engaging opposed racks 79 mounted on the movable beams 37 and 38, all the pinions 77 being connected to a longitudinal shaft 80 through bevel gears 81 and 82.

In order to actuate the composite beams 25a and 35 to extend the roof and floor sections of the trailer simultaneously, the pinions 59 and 77 are linked to driving means such as the wheel 83, illustrated in Fig. 2, for example. It will be noted that each of the pinion shafts 60 and 78 terminates in a rectangular stud 84 projecting toward the interior of the trailer. Accordingly, a pair of detachable drive shafts 85 and 86 formed at one end to fit the studs may be inserted into a wheel or handle 83 which is similarly arranged with a rectangular aperture to engage the other end of the shafts thus permitting the roof and floor of both extensible portions to be extended or retracted from a single location. If desired, a suitable power supply may be connected to operate the longitudinal shafts 63 and 80 in unison.

It will be apparent from the above that the invention provides an extensible trailer capable of use in either the extended or the retracted condition which may be extended and retracted smoothly and uniformly from a single position and may be utilized in the extended condition without external supports.

Although the invention has been described with reference to a specific embodiment, many variations and modifications will occur to those skilled in the art. Accordingly, the invention is not intended to be restricted in scope except as defined by the following claims.

We claim:
1. An extensible trailer comprising a chassis, a roofed housing mounted on the chassis, an extensible portion of the housing having a floor member and a roof member, a plurality of lower composite beams each having a fixed member mounted on the chassis and a movable member on which the floor member is mounted, said fixed and movable members being adapted to extend longitudinally with respect to each other, means for supporting the movable member from the fixed member in side-by-side relation thereto so that the floor member moves adjacent the top of the fixed member, the movable members of adjacent beams being disposed on adjacent sides of the fixed members of the beams, a plurality of upper composite beams each having a fixed member mounted on the roof of the housing and a movable member upon which the roof member of the extensible portion is mounted, said fixed and movable members being adapted to extend longitudinally with respect to each other, means for supporting the movable member from the fixed member in each of the upper composite beams, a longitudinal rack on the movable member of at least one of each of the upper and lower pluralities of composite beams, a pinion engaging each of the racks, vertical shaft means comprising a lower shaft portion engageable to drive the lower pinion, an upper shaft portion coaxial therewith and engageable to drive the upper pinion and vertically movable in driving relationship with the upper pinion, and wheel means for rotating the lower shaft portion and slidably engageable with the upper shaft portion to rotate it simultaneously with the lower shaft portion.

2. An extensible trailer comprising a chassis, a housing mounted on the chassis, two extensible portions disposed on opposite sides of the housing, a plurality of composite beams each having a fixed member mounted on the chassis and two movable members on opposite sides thereof each supporting one of the extensible portions and movable longitudinally in opposite directions with respect to the fixed member, the composite beams being arranged so that adjacent movable members are extendible in the same direction, a frame member mounted between each adjacent pair of movable beam members supporting a portion of the floor of in both the extended and contracted conditions, the movable beam members being supported from the fixed beam member in side-by-side relation so that a portion of the floor supported by the movable members moves adjacent the top of the fixed members and another portion of the floor is supported by the fixed members in coplanar relation thereto, fixed panel means mounted below the floor portions and panel means mounted on the movable beam members vertically spaced from the floor portions and arranged to overlap the fixed panel means.

3. An extensible trailer according to claim 2 wherein each of the frame members is movable with one of the extensible portions and is connected to the opposite extensible portion by telescoping guide means.

4. An extensible trailer according to claim 2 wherein the portions of the floor comprise permanent longitudinal panels mounted on the fixed and movable beam members and including removable panels mountable between the permanent panels when the trailer is in the extended condition.

5. An extensible trailer according to claim 2 wherein the movable member of each composite beam is supported from the fixed member by a plurality of longitudinally spaced rolling means mounted on one of the beam members and adapted to fit into a track in the other beam member.

6. An extensible trailer according to claim 2 including a longitudinal rack mounted on the movable members of at least two of the composite beams, a pinion engaging the teeth of each of the racks in each of the composite beams, and drive means connecting the pinions associated with each of the composite beams.

7. In an extensible trailer having a floor member with an extensible portion and a roof member with an extensible portion and including a first rotary drive means for extending the floor portion and second rotary drive means for extending the roof portion, a coupling device for rotating the first and second drive means simultaneously comprising vertical shaft means including a lower shaft portion engageable to drive the first rotary drive means, an upper shaft portion coaxial therewith engageable to drive the second rotary drive means and vertically movable in driving relationship with the first rotary drive means, and wheel means for rotating the lower shaft portion and slidably engageable with the upper shaft portion to rotate it simultaneously with the lower shaft portion.

References Cited in the file of this patent

UNITED STATES PATENTS

| | | |
|---|---|---|
| 1,964,894 | Rohne | July 3, 1934 |
| 2,177,394 | Pierce | Oct. 24, 1939 |
| 2,494,680 | Wiley | Jan. 17, 1950 |
| 2,581,192 | La Fleur | Jan. 1, 1952 |
| 2,675,277 | McClellan | Apr. 13, 1954 |
| 2,704,223 | Houdart | Mar. 15, 1955 |
| 2,744,781 | Black | May 8, 1956 |
| 2,801,878 | Rawlings | Aug. 6, 1957 |
| 2,842,972 | Houdart | July 15, 1958 |

FOREIGN PATENTS

| | | |
|---|---|---|
| 1,065,286 | France | Jan. 6, 1954 |
| 1,107,260 | France | Aug. 3, 1955 |
| 725,918 | Great Britain | Mar. 9, 1955 |

UNITED STATES PATENT OFFICE
CERTIFICATE OF CORRECTION

December 20, 1960

Patent No. 2,965,412

Robert Henderson et al.

It is hereby certified that error appears in the above numbered patent requiring correction and that the said Letters Patent should read as corrected below.

Column 1, line 28, for "contact" read -- contract --; column 3, line 22, for "36" read -- 26 --; column 5, line 36, after "floor of" insert -- the trailer --.

Signed and sealed this 27th day of February 1962.

(SEAL)
Attest:

ERNEST W. SWIDER
Attesting Officer

DAVID L. LADD
Commissioner of Pate